Aug. 25, 1964   P. D. MATTERSON   3,145,663
GEAR BOX MOUNTINGS FOR CRANES
Filed April 26, 1961   3 Sheets-Sheet 1
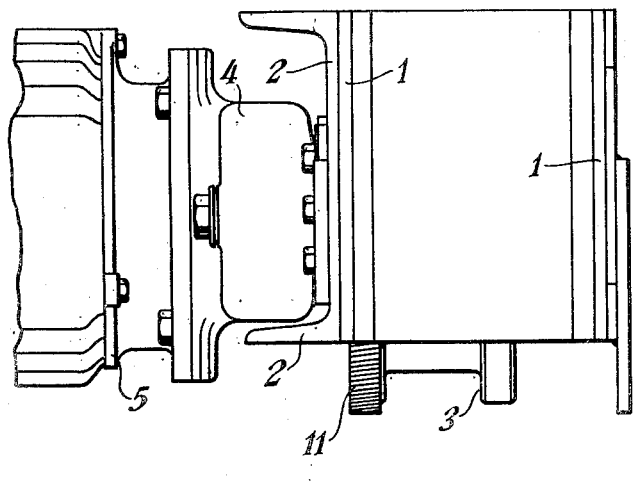
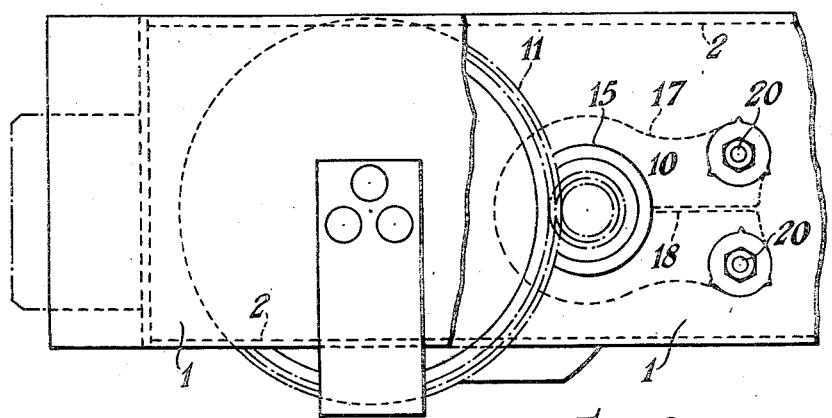
INVENTOR
PETER DUNSFORTH MATTERSON
BY  *Kenwood Ross*
ATTORNEY

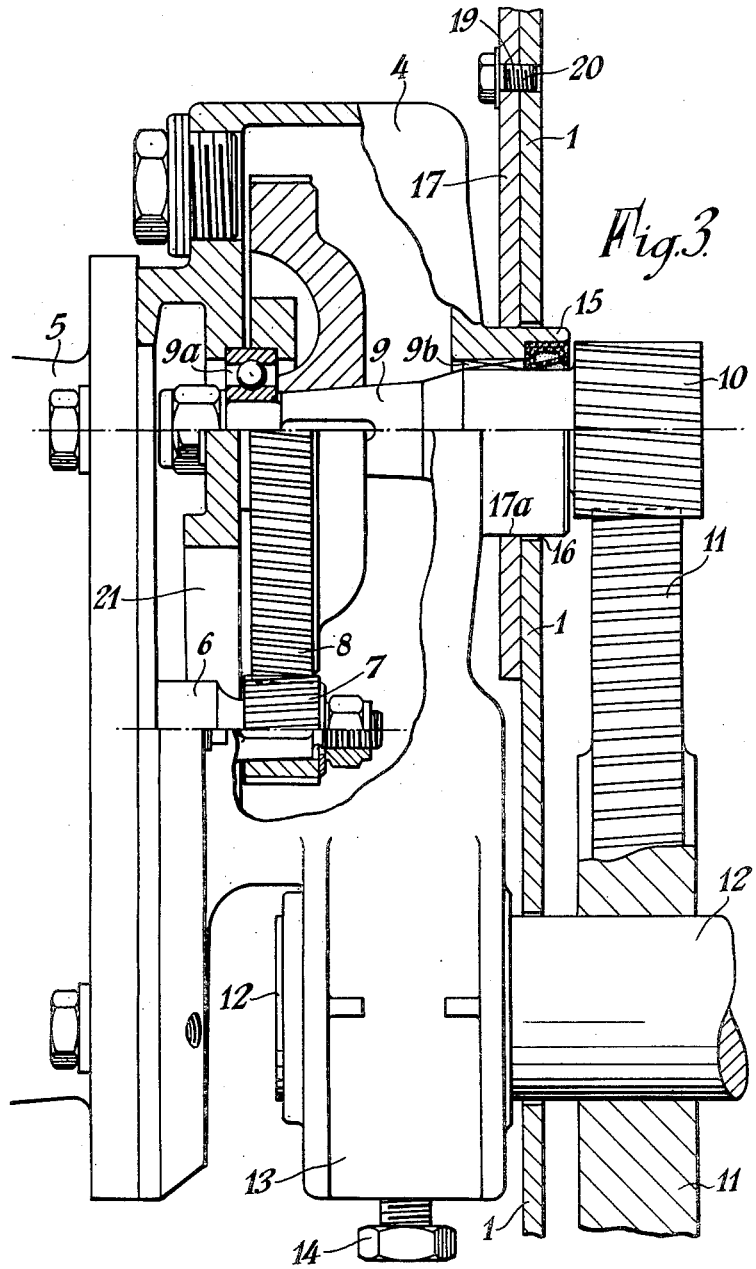

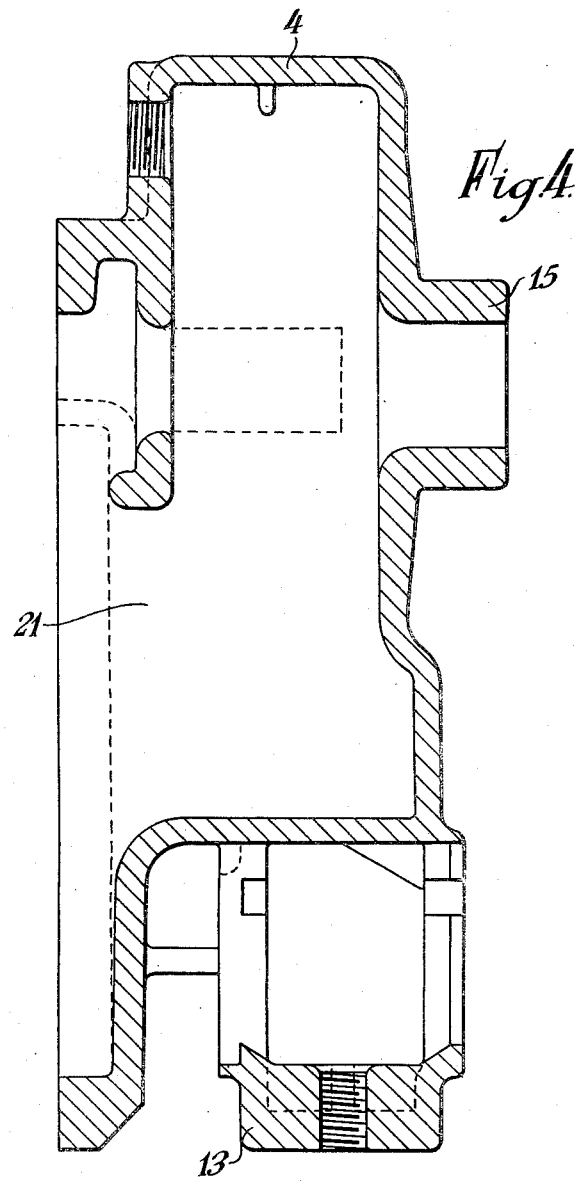

United States Patent Office 3,145,663
Patented Aug. 25, 1964

3,145,663
GEAR BOX MOUNTINGS FOR CRANES
Peter Dunsforth Matterson, Rochdale, England, assignor to Doity Cranes Limited, Manchester, England, a British company
Filed Apr. 26, 1961, Ser. No. 105,721
Claims priority, application Great Britain Apr. 27, 1960
1 Claim. (Cl. 105—136)

This invention relates to the drive transmission of a crane, and is concerned more particularly with a method of mounting on the end carriage or equivalent part of a crane, a gear box, the output shaft of which carries a toothed pinion for the final drive to the track wheel mounted in such end carriage.

Such track wheel is provided with a large diameter toothed wheel arranged to be driven by said pinion and which may be exteriorly or interiorly toothed. Hitherto, difficulty or delay has been encountered in positioning a gear box on said end carriage or the like so as to ensure a correct degree of mesh between its output pinion and such large diameter wheel. This work has hitherto required a careful location of the gear box and pinion by a skilled fitter.

The object of this invention is to remove the necessity for the precise fitting work hitherto called for and to allow for a much more easy and controllable setting of the said driving pinion by referring the adjustment of the gear box to the center of the drive axle or to some equivalent fixed datum on the crane structure. Thereby, both difficulty and delay are avoided, and other advantages result as will appear below.

According to this invention, the gear box is formed so as to be mounted pivotally on the said axle or on some other relatively fixed part serving as a pivot, for movement in a plane parallel to the plane of said large-diameter toothed wheel, and said gear box is formed or provided with an external boss or hub around which is sprung a clip member able to grip the same tightly which clip member is shaped for bolting to the frame or carriage of the crane, in the adjusted position of the gear box in order to secure the latter in its selected position. As the gear box is machined with a specified distance between its pivot axis and the axis of the output pinion, this distance being related to the pitch radius of the said large diameter toothed wheel, correct mesh between pinion and wheel is ensured automatically in all positions of the gear box. The usual provision may be made, if necessary to adjust the pinion axially so as to obtain maximum width with said wheel.

Usually, the said hub or boss of the gear box on to which the clip is sprung will be located around the output shaft of the gear box, between the said pinion and the gear box wall. This allows, to some extent, of carrying the gear loading directly to the frame.

According to the invention, also the gear box is arranged to carry the driving motor at one side and, at the other side, it has the hub or boss around the output shaft, at another part it has a hub for fitting on to the axle of the track wheel, and it is so fashioned that a relatively large aperture through which the internal gears are entered for assembly, becomes closed by the base or flange of the driving motor when the latter is in position.

The said spring clip member is preferably in the form of a flat metal plate having a through hole to fit on to the said boss and having a slot extending from said hole to the outer edge, the diameter of the hole being such that the clip needs to be opened to allow the hole to fit over the said boss, whereafter the clip is closed so as to grip the boss tightly. Provision is made for bolting the clip to the flange or web of an adjacent girder or channel of the frame.

The invention also provides a gear box in which the number of oil joints is reduced to a minimum, consistent with the necessity for an input and output shaft and for an opening through which the gears may be inserted for assembly, and it provides the usual breather, drain plug and filler-cum-level plug. The ararngement is such that the bolts which secure the motor to the gear box are not in contact with the oil in the gear box.

In a modification, the crane is driven by a central motor with a cross shaft, and the gear box takes the form of a self-locating bearing pedestal.

The invention will now be described with reference to the accompanying drawings, wherein:

FIG. 1 is an end view of a part of a crane carriage with the invention applied thereto;
FIG. 2 is a partial side view looking to the right of FIG. 1;
FIG. 3 is an enlarged part sectional view of the gear housing and its mounting on the crane carriage; and
FIG. 4 is a cross section through a slightly modified form of the gear housing.

As shown, the side frame of the crane carriage is made up of inner and outer plates 1 and channels 2, the inner and outer parts being braced together at suitable points, and this frame of the crane carriage carries one end of the axles (not shown in FIGS. 1 and 2) for the track wheels 3. Positioned at one side of this frame, and held by means described below, is the gear box or housing 4 and to the outside of that again is bolted the driving motor 5.

As shown mostly in FIG. 3, the driving shaft 6 from the motor 5 enters the gear housing 4 and is fitted with a driving pinion 7, this pinion meshing with a larger toothed wheel 8 mounted on a short axle 9 housed in bearings 9a, 9b in the gear housing 4, the axle 9 extending out of the housing and carrying at its outer end a toothed pinion 10 which meshes with a larger-diameter driven wheel 11 on the axle 12 of the crane carriage, the wheel 11 being connected to the track wheel 3. The said axle 12 is a non-rotary axle, the combined toothed wheel 11 and track wheel 3 rotating freely thereon.

It will be seen therefore that through the reduction gearing 7, 8 between the motor shaft 6 and the driving axle 9 there is a drive to the pinion 10, which rotates the larger-diameter wheel 11 to traverse the crane along its trackway.

The lower end of the gear housing 4 has an extension 13 machined to receive the protecting end of the crane axle 12 and there is a gripping screw 14 machined so as to fix the gear housing angularly on that shaft. At its upper part, the gear housing 4 is formed with an external machined boss 15 which encloses the bearing 9b for the said driving axle 9, and the adjacent side plate 1 of the crane carriage has an opening 16 through which this boss 15 may pass, so that the boss extends almost up to the driving pinion 10.

Provided on the said boss 15, on the outer side of the said side plate 1 is a split metal plate or clip 17 (see FIG. 2) this clip having a machined opening 17a of slightly smaller diameter than the diameter of the said boss 15. Before the gear housing 4 is brought to the crane carriage, the slit 18 in said clip 17 is opened, for example by driving a wedge into its outer end, so as to enable the clip to pass on to the said boss 15 whereafter the wedge is withdrawn and the clip becomes held in place firmly on the boss by reason of its own resiliency.

This clip 17 is so positioned axially of the boss 15 that it lies flat against the side plate 1 of the crane carriage and, with the gear box in the position required the side-plate 1 is bored in register with openings 19 in the clip 17 to receive clamping screws 20 whereby the clip is firmly fixed to the side-plate and, by reason of gripping the said boss 15 holds the gear housing 4 firmly in position, resisting the torque generated around the axle 12 by the pinion 10. Thus resistance to torque loading is provided directly in the vicinity where the loading takes place.

The pinion 7 and gear 8 may be keyed to the respective spindles 6 and 9, but it is preferred that plain taper formations be used, otherwise as shown in the drawings, with screw and nut means on the ends of the spindles for forcing the inter-fitting taper parts into contact. This may apply also to the pinion 10.

It will be seen from the drawings that the number of oil joints in the gear box is reduced to a minimum. It will be seen also that the housing 4 is formed with a substantially large opening 21 through which the gears may be inserted into the housing for assembly on their respective shafts. There will be the usual breather, drain plug and fillter-cum-level plug. As will be apparent from FIG. 3, the construction is such that the bolts securing the motor to the gear box are out of contact with any oil in the gear box.

What I claim is:

In a drive transmission of a crane, the crane being traversible along a trackway and including a crane carriage having a frame for supporting a non-rotary axle of a track wheel and a driven wheel with the track and driven wheels being driven unisonly for traversing the crane along its trackway; the improvement comprising, a power unit positioned at one side of the frame of the crane carriage and constituted by a gear housing supporting a driving motor with an output shaft extending from the driving motor and into the gear housing and fitted with a driving pinion, a toothed wheel mounted on a driving axle journalled in the gear housing of said power unit and meshing with the driving pinion of said power unit, the driving axle of said toothed wheel extending outwardly of the gear housing of said power unit and carrying a driving pinion meshing with the driven wheel on the non-rotary axle of the crane carriage, means for securing the gear housing of said power unit angularly relative to the non-rotary axle, the gear housing having a boss through which the driving axle is extendable, and clip means receivable axially of the boss of the gear housing for securement to the frame of the crane carriage and holding the gear housing in selected position of adjustment relative to the frame and resisting torque generated around the non-rotary axle by the driving pinion, and means securing said clip means to said frame.

References Cited in the file of this patent
UNITED STATES PATENTS
2,997,966      Chapin et al. _____ Aug. 29, 1961
FOREIGN PATENTS
485,102        Germany _____ Oct. 26, 1929
140,508        Switzerland _____ Aug. 16, 1930